United States Patent [19]

Brüls

[11] Patent Number: 5,646,692
[45] Date of Patent: Jul. 8, 1997

[54] DEVICE FOR TRANSMITTING A HIGH DEFINITION DIGITAL PICTURE SIGNAL FOR USE BY A LOWER DEFINITION PICTURE SIGNAL RECEIVER

[75] Inventor: Wilhelmus H. A. Brüls, Eindhoven, Netherlands

[73] Assignee: U.S. Philips Corporation, New York, N.Y.

[21] Appl. No.: 641,706

[22] Filed: May 2, 1996

Related U.S. Application Data

[63] Continuation of Ser. No. 276,004, Jul. 15, 1994, abandoned.

[30] Foreign Application Priority Data

Jul. 16, 1993 [BE] Belgium .................... 09300746

[51] Int. Cl.$^6$ ................................... H04N 7/26
[52] U.S. Cl. ................. 348/438; 348/432; 386/123
[58] Field of Search ....................... 348/388, 387, 348/389, 397, 426, 432, 433, 436, 437, 438; 386/123, 37; H04N 7/26

[56] References Cited

U.S. PATENT DOCUMENTS

| | | | |
|---|---|---|---|
| 4,575,754 | 3/1986 | Bar-Zohar | 348/420 |
| 5,055,927 | 10/1991 | Keesen et al. | 348/389 |
| 5,196,931 | 3/1993 | Kondo | 348/420 |
| 5,196,933 | 3/1993 | Henot | 348/420 |
| 5,253,055 | 10/1993 | Civanlar et al. | 348/420 |
| 5,262,854 | 11/1993 | Ng | 348/416 |
| 5,363,205 | 11/1994 | Shou et al. | 348/409 |
| 5,410,354 | 4/1995 | Uz | 348/441 |

FOREIGN PATENT DOCUMENTS 0272762  6/1988  European Pat. Off. ......... H04N 1/41

OTHER PUBLICATIONS

"Standard for recording digital television signals on magnetic tape in cassettes", EBU-Tech. 3252-E, Sep. 1986, pp. 44–48.

Primary Examiner—Victor R. Kostak
Attorney, Agent, or Firm—Laurie E. Gathman

[57] ABSTRACT

By compressing HDTV pictures, they can be recorded on digital SDTV video recorders. Such recorders are widely used in professional studios. The invention relates to a device for formatting the compressed HDTV signal in such a way that the DC values of successive 8*8 picture blocks are processed by SDTV recorders as a smaller but recognizable SDTV sub-picture. Low-cost editing of HDTV programs with standard equipment (SDTV recorders and receivers) is possible with such a device, while the edited final result can be transmitted as a HDTV signal without any further processing operation.

20 Claims, 4 Drawing Sheets

DEVICE FOR TRANSMITTING A HIGH DEFINITION DIGITAL PICTURE SIGNAL FOR USE BY A LOWER DEFINITION PICTURE SIGNAL RECEIVER

This is a continuation of application Ser. No. 08/276,004 filed Jul. 15, 1994, abandoned.

FIELD OF THE INVENTION

The invention relates to a device for transmitting a digital picture signal. More particularly, the invention relates to a device provided with encoding means for forming a mean value and a series of other data words of successive picture blocks of the picture signal. Transmission of picture signals is also understood to mean recording and reproducing the signals. The invention also relates to a device for receiving a digital picture signal.

BACKGROUND OF THE INVENTION

Devices of the type described in the opening paragraph for transmitting a high-definition (HDTV) picture signal are generally known. By means of, for example picture transform and coding of coefficients obtained therefrom it has been found possible to compress HDTV picture signals to a considerably lower bit rate than would be necessary for the uncompressed picture signal. Such devices will in due course provide the possibility of realising HDTV video recorders having technically and economically feasible specifications as regards their electrical and mechanical aspects and as regards the use of tapes. Video recorders for recording, editing and displaying of digital picture signals having a lower standard definition (SDTV) are, however, already produced in large quantities. For example, professional PCM video recorders which can record and play back an uncompressed digital SDTV picture signal are still available in large quantities and to an increasing extent. Also in the future, they will be considerably cheaper than HDTV recorders for a long time.

It is possible to compress HDTV picture signals to a bit rate which corresponds to that of an uncompressed SDTV picture signal. In principle, the compressed HDTV signal can then be transmitted via available SDTV channels and registered on the known PCM recorders. However, compression and decompression units (integrated or not integrated in recorders) and HDTV monitors are required for editing HDTV programs. This involves a costly investment in appropriate HDTV equipment.

OBJECT AND SUMMARY OF THE INVENTION

It is an object of the invention to transmit or record a high-definition compressed picture signal in a channel bit stream in such a way that an acceptable picture is obtained when this picture signal is decoded and displayed at a lower definition.

To this end the device according to the invention is characterized in that it comprises formatting means for accommodating the mean value of successive picture blocks of each picture at those positions of the channel bit stream which form a sub-picture in a picture signal of lower definition.

It is thereby achieved that upon playback of the encoded HDTV picture signal on an SDTV recorder and upon display on a standard television receiver a smaller but acceptable sub-picture is obtained. The rest of the picture becomes manifest as a kind of noise. Thus it will be possible to ascertain by means of already available recorders and receivers which television scenes are recorded on a tape. Moreover, low-cost editing of HDTV programs with standard equipment is possible, while the assembled final result can nevertheless be transmitted without any further post-processing operation via a decoding unit and displayed on HDTV receivers. Special attention should be drawn to the fact that available facilities in SDTV recorders for trick modi such as fast search are also applicable to editing HDTV signals. In practice, all this appears to yield considerable operational advantages. A very attractive fact is that no extra facilities are necessary. It is notably unnecessary to use extra bits for formatting the HDTV picture signal, which would be at the expense of the compression efficiency.

It is to be noted that European Patent Application EP 0 272 762 discloses a device for splitting HDTV picture signals into two bit streams, one bit stream of which represents a compatible SDTV picture signal and the other bit stream comprises supplementary data for the full reconstruction of the HDTV picture signal. The SDTV picture signal may be displayed with the lower definition on the full screen of standard television receivers. However, recording, editing and display of the HDTV picture signals still requires special HDTV video recorders which are adapted to process both bit streams.

A corresponding device for receiving a compressed high-definition digital picture signal is characterized in that it comprises reformatting means for splitting the channel bit stream into the mean values and the other data words.

DETAILED DESCRIPTION OF EMBODIMENTS

Figure 1:
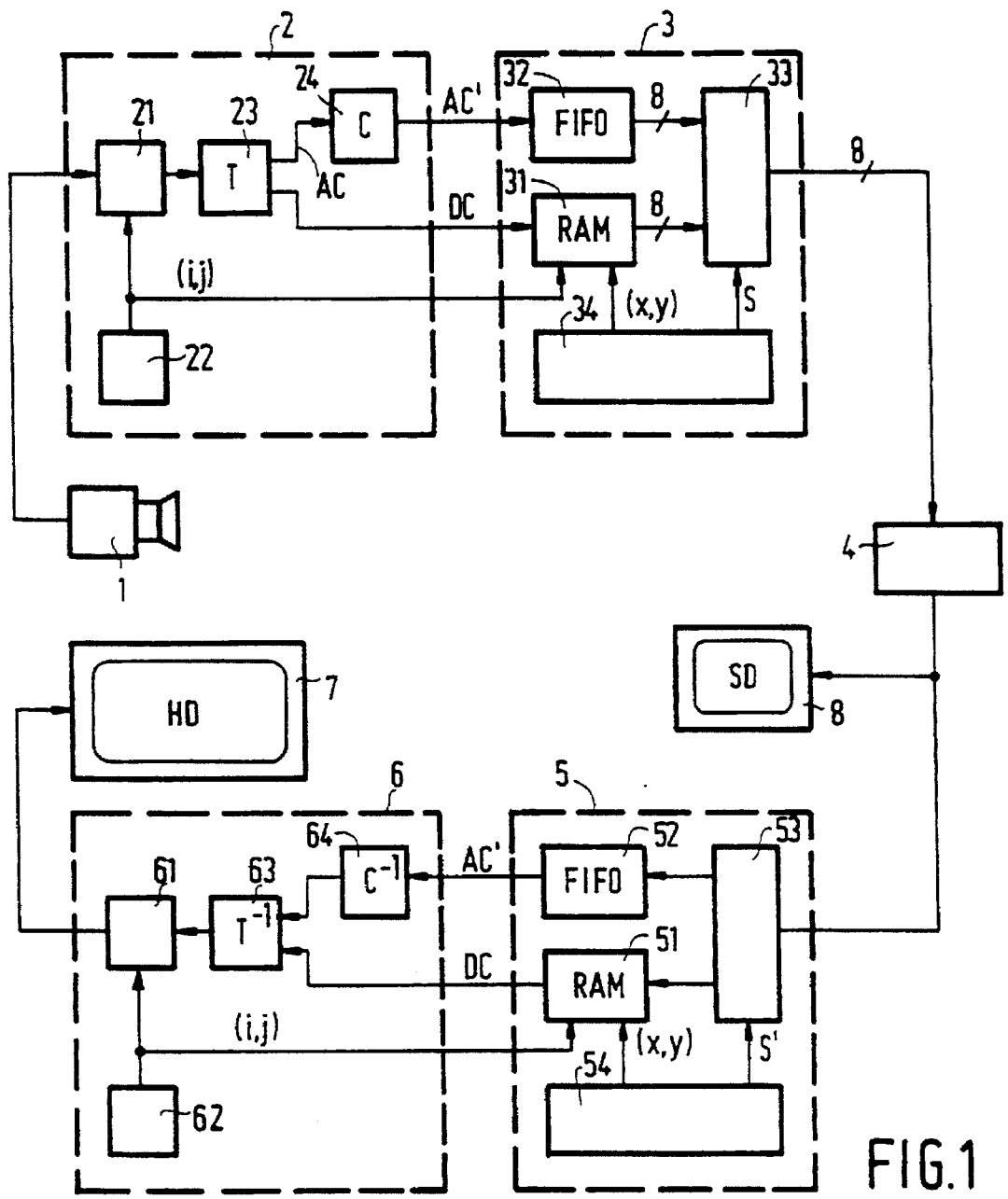
FIG. 1 shows a transmission system comprising a device for transmitting and a device for receiving high-definition picture signals according to the invention.

FIG. 1 shows a transmission system for high-definition picture signals. The system comprises successively a HDTV picture source 1, an encoding unit 2, a formatting unit 3, a digital video recorder 4, a deformatting unit 5, a decoding unit 6 and a HDTV receiver 7. The encoding unit 2 and the formatting unit 3 constitute the device for transmitting picture signals according to the invention. The reformatting unit 5 and the decoding unit 6 constitute the device for receiving the picture signals according to the invention. The transmitted digital picture signals are also applied to a standard television receiver 8 via a D/A converter (not shown).

Picture source 1, for example a HDTV camera, generates a picture signal at a high definition of, for example 1440 pixels per line and 1152 lines. This picture signal is applied to the encoding unit 2 which is known per se and will only be described as far as this important for a satisfactory understanding of the invention. The encoding unit comprises a picture memory 21 by means of which the HDTV picture is divided into picture blocks of, for example 8*8 pixels. These picture blocks have a block address (i, j) which is generated by an addressing circuit 22. Each picture block is subjected in a transformer 23 to an orthogonal picture transform, for example Discrete Cosine Transform (DCT). Such a transformer supplies a series of 64 coefficients for each picture block of 8*8 pixels. Of these coefficients, one represents the mean value of the picture block. This coefficient will hereinafter be referred to as the DC value of the picture block. The other coefficients are AC coefficients. These coefficients are applied to a quantizing and coding circuit 24 in which they are subjected to, for example variable-length coding. The code words thus obtained, which are representative of the AC coefficients of a picture block, are denoted by AC' in the Figure.

In practice, the encoding is realised separately for the luminance signal Y and the chrominance signals U and V. The chrominance signals are often sampled at a lower sample frequency so that one picture block U and one picture block V are present for two consecutive picture blocks Y. They are transformed and coded in the sequence YUYV.

A considerable compression can be achieved by means of the encoding unit 2. In the relevant case, this factor will be assumed to be 4. The quantity of data for each compressed HDTV picture is then equal to that of an uncompressed SDTV picture which, as is known, comprises 720 pixels per line and 576 lines. Digital video recorders for recording such uncompressed SDTV picture signals are known. They are described, for example in "Standard for recording digital television signals on magnetic tape in cassettes", EBU-Tech. 3252-E, Sep. 1986. As described in this article, 8-bit data words are applied to this video recorder in the sequence YUYV in which Y represents the luminance of a pixel and U and V represent the chrominance of a pair of pixels. The video recorder 4 shown in the Figure is preferably such a video recorder.

The HDTV picture signal compressed by the encoding unit 2 and comprising the DC value as well as the code words AC' of each picture block is applied to the formatting unit 3. This unit comprises a first memory 31 to which the DC values are applied, a second memory 32 to which the code words AC' are applied, a multiplexer 33 and a control circuit 34. Moreover, the formatting unit receives the block coordinates (i, j) of the current picture block. In the embodiment shown the first memory 31 is a RAM and the second memory 32 is a FIFO. If desired, the second memory 32 may also be of the RAM type. In that case both memories may be implemented as one integrated memory and the multiplexer is superfluous.

Figure 2:
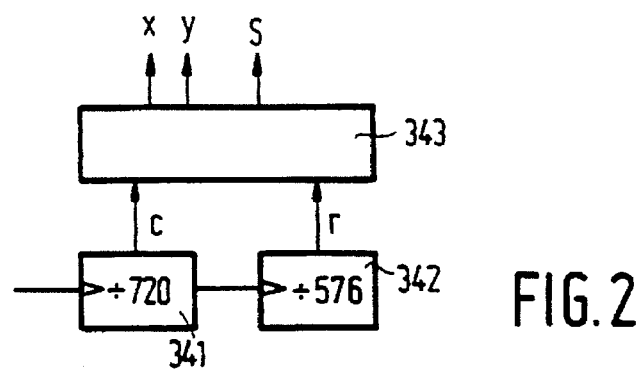
FIG. 2 shows the structure of a control unit shown in FIG. 1.

The operation of the formatting unit will now be explained as regards the luminance information Y. The chrominance signals U and V are processed identically. The DC value of each picture block Y is stored in the RAM 31, which receives the block coordinates (i, j) as a write address from addressing circuit 22. The other code words AC' of the picture block are written at successive locations of FIFO 32. After all picture blocks of a picture have been stored in this way, the memories are read under the control of control circuit 34. In practice, the memories may have a double implementation in order that reading of a picture coincides with storage of the next picture. The control circuit is further shown in FIG. 2. It comprises a 720-divider 341 which receives clock pulses at a frequency of 13.5 MHz, followed by a 576-divider 342. The 720-divider generates a column number c, the 576-divider generates a row number r. These numbers are applied to a decoder 343 which constitutes a read address (x, y) and a selection signal S from c and r. Those skilled in the art can conceive practical embodiments of this decoder from the following relations:

$S=0$ for $270 \leq c < 450$ and $216 \leq r < 360$ $x = c - 270$ $y = r - 216$

Figure 3A:
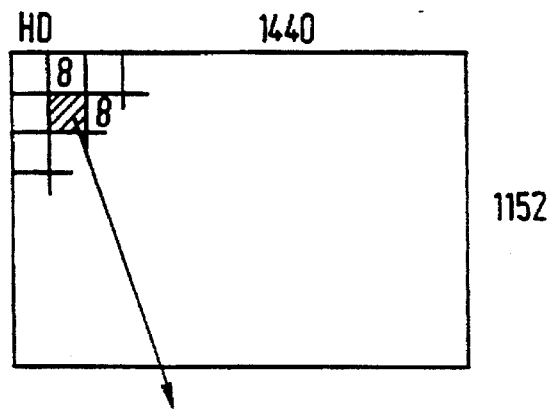
FIGS. 3A and 3B show the structure of a HDTV picture and a corresponding SDTV picture for explaining the operation of a formatting unit shown in FIG. 1.
Figure 3B:
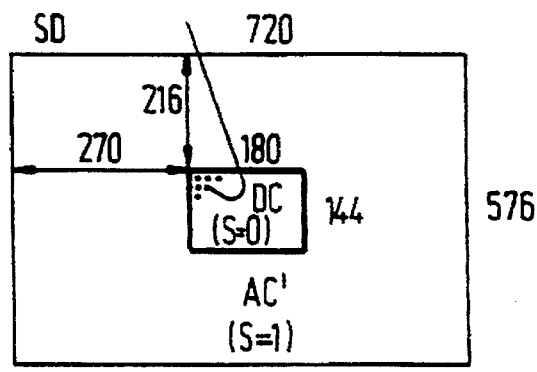

The two memories are thus read in the form of 576 series of 720 8-bit words each, analogously to the 576 picture lines of 720 pixels each of an imaginary SDTV picture signal in PCM format. The FIFO 32 is read by means of the value $S=1$ and selected for output by the multiplexer 33. Reading of the FIFO is interrupted by means of the value $S=0$ and data is selected from RAM 31. As is apparent from the foregoing and as has been attempted to show in FIG. 3, the DC value of pixel block (i, j) stored in RAM address (i, j) corresponds to pixel (270+i, 216+j) of the imaginary SDTV signal. The 180*144 DC values of the original HDTV signal (FIG. 3A) thus constitute, as it were, a sub-picture in an imaginary SDTV picture (FIG. 3B). Said sub-picture has a dimension of 180*144 pixels and an arbitrarily adjustable origin (here (270, 216)).

The DC values of luminance and chrominance blocks are grouped in the sequence YUYV. The output signal thus obtained is applied to SDTV recorder 4 and/or SDTV receiver 8 (see FIG. 1). Both apparatuses interpret consecutive 8-bit words as consecutive PCM pixels of an uncompressed SDTV picture signal. In this way, the transmitted signal can be recorded, played back and displayed as a genuine SDTV signal. Since each pixel in the sub-picture represents the mean value of a corresponding 8*8 HDTV picture block, the sub-picture constitutes a smaller, but recognizable and acceptable version of the full HDTV picture. The aspect ratio of the sub-picture (4:3) differs from that of the HDTV picture (16:9), but this is no drawback for recognizing the picture. The pixels outside the sub-picture are successive 8-bit samples of a bit stream of variable-length code words. In SDTV display, they appear to form a kind of noise which is not troublesome for the perception of the sub-picture.

The compressed HDTV picture signals can thus be recorded and played back with standard recorders, and judged with standard receivers. Editing is no problem and is possible without having to use any further additional facilities. As far as video recorders are equipped with facilities such as stills, fast search and the like, they also apply to the HDTV sub-pictures. Experiments have proved that even 40 times faster display still yields a recognizable sub-picture.

Ultimately, an edited HDTV television program is of course displayed again on a HDTV receiver. Reverting to FIG. 1, it appears that a deformatting unit 5, a decoding unit 6 and a display device 7 are provided for this purpose. The deformatting unit comprises a demultiplexer 53, a first (RAM) memory 51, a second (FIFO) memory 52 and a control circuit 54. All these elements have the same structure as the corresponding elements of the formatting unit 3 already described. A more detailed explanation of the operation is therefore unnecessary. It is only to be noted that the selection signal applied to demultiplexer 53 is now denoted by S' and that the address (x, y) applied to the RAM 51 is now a write address.

The decoding unit 6 comprises an addressing circuit 62 which generates successive read addresses (i, j) for reading the DC values of each picture block stored in RAM 51. Moreover, the decoding unit receives, from each picture block, the code words AC' which are representative of the AC coefficients. The code words AC' are applied to a decoding circuit 64 with which the original AC coefficients are regained. An inverse picture transformer 63 transforms the coefficients of a picture block back to the pixel domain and stores the pixels thus obtained in a picture memory 61 under the control of block coordinates (i, j). The 1440*1152 pixels of the HDTV picture are regained in this further known manner.

Figure 4:
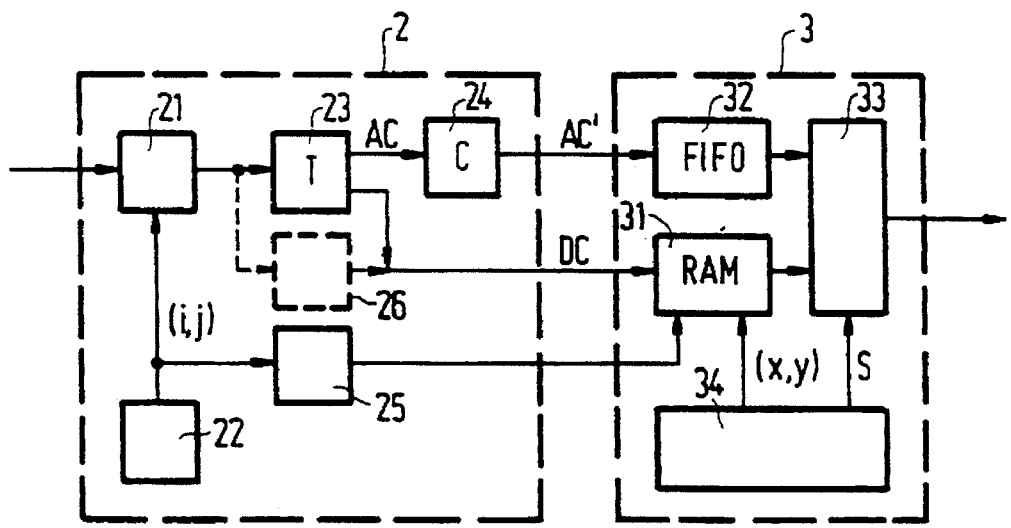
FIG. 4 shows a further embodiment of the device for transmitting a picture signal.

It has been assumed in the foregoing that the compression factor is 4 so that the resultant bit rate exactly corresponds to that of an uncompressed SDTV signal. At higher compression factors a shorter bit stream is produced for each picture than the bit stream for an uncompressed SDTV picture. If desired, a plurality of DC values can be accommodated in the channel bit stream space thus obtained, so that a larger sub-picture is obtained. In order to explain this, FIG. 4 shows a further embodiment of the device for transmitting the picture signal. Elements in this Figure having the same function as those in FIG. 1 are denoted by the same reference numerals.

The device shown in FIG. 4 now comprises an address converter 25 which successively generates four write addresses $(2i, 2j)$, $(2i, 2j+1)$, $(2i+1, 2j)$ and $(2i+1, 2j+1)$ for the RAM 31 for each block coordinate (i, j). In this way, the DC value of each 8*8 picture block is written four times into RAM 31. Moreover, the control circuit 34 in this embodiment is formed in such a way that the following relations apply (see decoder 343 in FIG. 2):

$S=0$ for $180 \leq c < 540$ and $144 \leq r < 432$ $x=c-180$ $y=r-144$

Figure 6A:
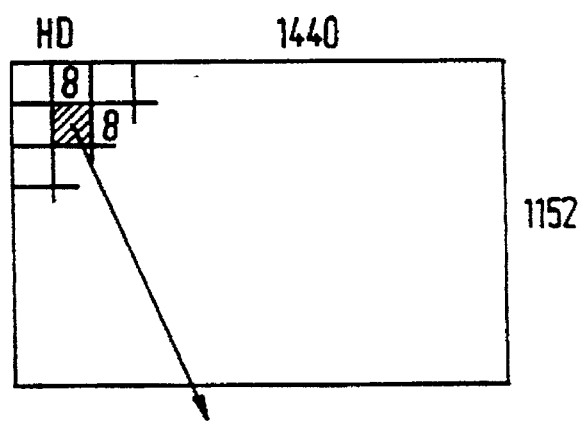
FIGS. 6A and 6B show the structure of a HDTV picture and a corresponding SDTV picture for explaining the operation of the embodiments shown in FIGS. 4 and 5.

It has been attempted to show in FIG. 6 that the corresponding SDTV sub-picture now comprises 360*288 pixels. In other words, it is twice as large in the horizontal and vertical directions as the sub-picture shown in FIG. 3. The SDTV sub-picture can thus be better recognized but it does not have an enhanced resolution.

Figure 5:
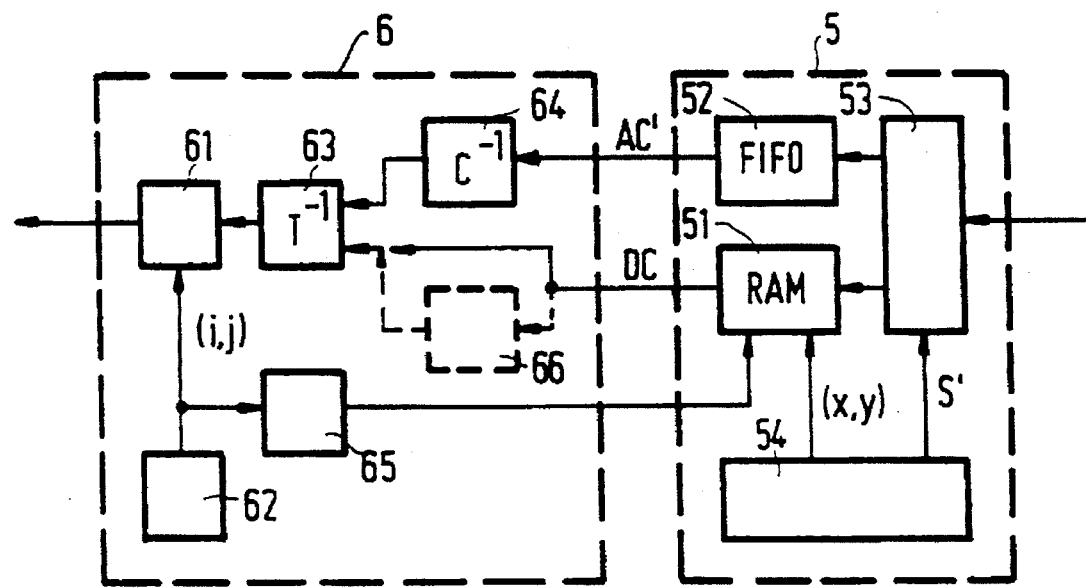
FIG. 5 shows a further embodiment of the device for receiving a picture signal.

FIG. 5 shows the corresponding device for receiving the picture signals. This device comprises an address converter 65 which causes one of the RAM locations $(2i, 2j)$, $(2i, 2j+1)$, $(2i+1, 2j)$ or $(2i+1, 2j+1)$ to be read for block coordinate (i, j). The actually read location is not important because the same DC value is stored at all four locations.

Figure 6B:
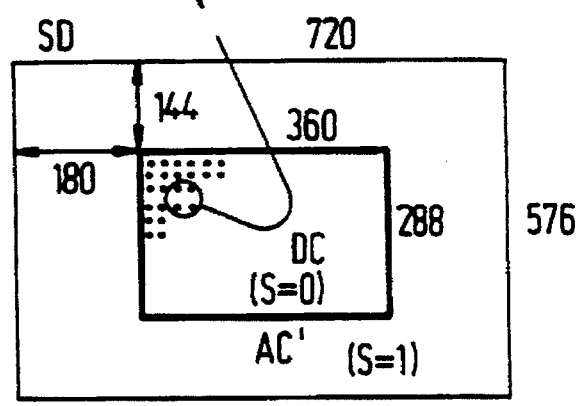

The resolution of the larger sub-picture thus obtained can be enhanced by not duplicating the one DC value but by generating four distinct DC values for each 8*8 picture block. This is shown in FIG. 4 by means of a broken line DC producer 26. It divides each applied picture block of 8*8 pixels into four sub-blocks of 4*4 pixels and computes the average luminance and chrominance values for each sub-block. The four DC values are stored at the afore-mentioned RAM locations $(2i, 2j)$, $(2i, 2j+1)$, $(2i+1, 2j)$ and $(2i+1, 2j+1)$. The resolution of the sub-picture shown in FIG. 6B is now doubled in both the horizontal and the vertical direction.

The corresponding device for receiving the picture signal now comprises a DC averager 66 (shown in broken lines in FIG. 5). This averager receives the four DC values and averages them so that the mean value of the 8*8 picture block is regained again. The value obtained is applied as a DC coefficient to the inverse picture transformer 63.

It may be noted with respect to the embodiments shown in FIGS. 4 and 5 that, if desired, the sub-picture can be magnified in only one (horizontal or vertical) direction. This option is sensible when the compressed HDTV picture signal only provides space for accommodating, per picture block, two DC values in the channel bit stream. It is true that the aspect ratio of the sub-picture is then affected but the sub-picture can still be recognized. It is also possible to form the distinct DC values from the DC coefficient of a transformed picture block and the three AC coefficients of the lowest order.

Figure 7:
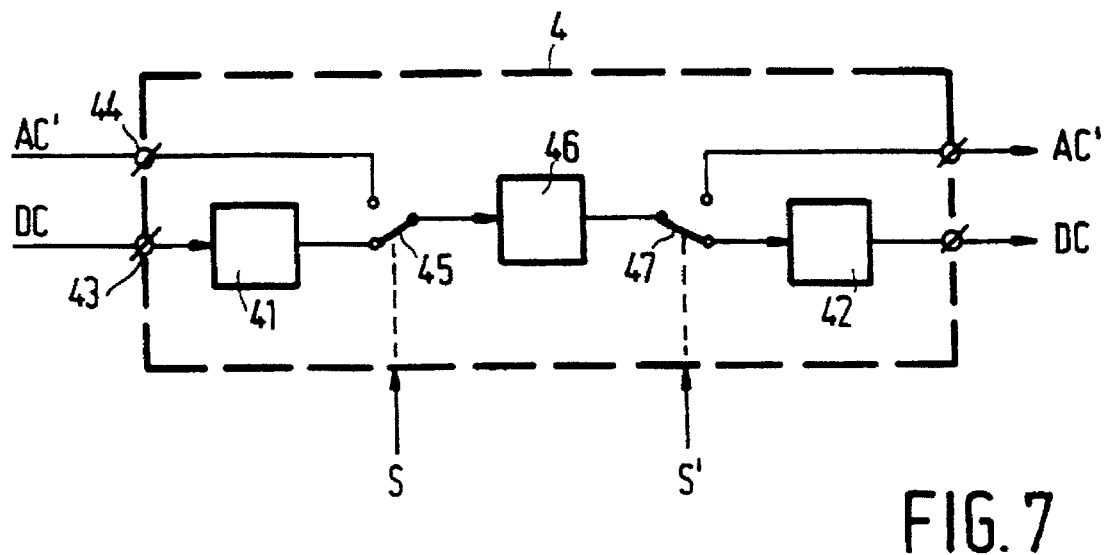
FIG. 7 shows an example of the use of an alternative embodiment of a video recorder in the transmission system shown in FIG. 1.

It has always been assumed in the foregoing that the video recorder is of a type recording the applied SDTV signals in an uncompressed form. However, the invention can also be used for other types of SDTV video recorders. For example, FIG. 7 shows a video recorder 4 which itself is provided with a compression unit 41 and a decompression unit 42. Now, only the sub-picture with the DC values is presented to a digital input 43 for receiving digital SDTV signals (for example in the YUYV format already referred to). Upon recording, the sub-picture is compressed and upon display it is decompressed. The code words AC' are presented to a further input 44 and directly stored on tape 46 via a switch 45. The switch 45 is controlled by the selection signal S of the formatting unit 3 (FIG. 1). The reason behind this is that the usual compression methods are only effective if they are used for genuine television pictures in which there is a correlation between contiguous pixels. This is the case for the sub-picture. However, the compression would be unsuitable for the code words AC' because the required correlation between consecutive 8-bit words is absent. The recorder 4 now functions, as it were, as a video recorder during the sub-picture and as a data recorder outside this picture, so that at least the sub-picture is displayable on a standard television receiver. Upon playback, the compressed sub-picture is applied to the decompression unit 42 for regaining the DC values and for display on the standard television receiver 8. The code words AC' are directly read from the tape 46 via a second switch 47. In this case, the switch 47 is controlled by the selection signal S' of the deformatting unit 5 (see FIG. 1).

Alternative embodiments of the transmission system according to the invention are possible. It is, for example, possible for the DC coefficient of a HDTV picture block to be a 9-bit value, while the SDTV video recorder wants to receive 8-bit pixels. In that case the least-significant bit of the DC value can be accommodated in the data stream AC'. It is alternatively possible to incorporate additional error-correcting bits in the formatted HDTV output signal to enable correction of bit errors made by the recorder.

Figure 8:
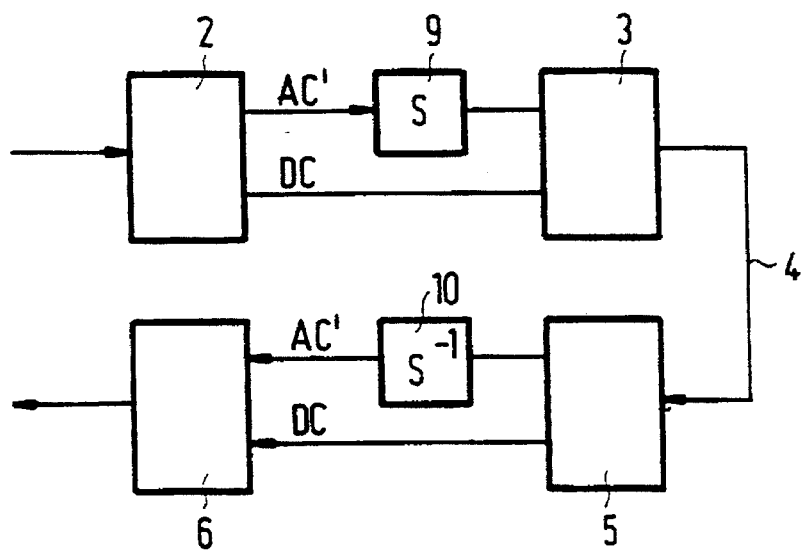
FIG. 8 shows a transmission system provided with a scrambler and a descrambler.

An attractive use of the inventive idea is shown in FIG. 8. The transmission system shown in the Figure comprises the encoding unit 2 and the formatting unit 3 at the transmitter end. The data stream AC' is scrambled by means of a scrambler 9 but the DC values remain unaffected. The receiver end comprises the deformatting unit 5, the decoding unit 6 and a descrambler 10. Since the DC values are not scrambled, display in the form of a sub-picture is readily possible. However, a full reconstruction of the picture is only possible by means of the descrambler 10 and an appropriate code. In this way, a viewer can be tempted to pay for a subscription.

I claim:

1. A device for transmitting a high-definition digital picture signal in the form of a single channel bit stream, comprising encoding means for forming a first component including a mean value and a second component including a series of other data words for successive picture blocks, wherein the encoding means compresses said high definition digital picture signal channel bit stream into a single channel bit stream with said first component substantially representing an uncompressed channel bit stream for a picture signal having lower definition, and formatting means for accommodating the mean value for successive picture blocks at positions of the channel bit stream which form a sub-picture in a picture signal having a lower definition.

2. A device as claimed in claim 1, wherein the encoding means comprise a picture transformer (23) and in which the mean value is formed by the DC coefficient of a transformed picture block or a group of transformed picture blocks of the picture signal.

3. A device as claimed in claim 1 wherein the device is further provided with means (25, 26) for forming a plurality of mean values of sub-blocks for each picture block.

4. A device as claimed in claim 1, wherein the formatting means (3) comprise a first memory (31) for storing the mean values, a second memory (32) for storing the other data words, and control means (33, 34) for reading the first memory during a sub-picture period and for reading the second memory outside said sub-picture period.

5. A device for receiving a high-definition digital picture signal in the form of a single channel bit stream, the single channel bit stream being a compressed high definition digital picture signal channel bit stream substantially representing an uncompressed channel bit stream for a picture signal having lower definition, the device comprising decoding means for forming a picture block of the high-definition signal from a first component including a mean value and a second component including a series of other data words for successive picture blocks, wherein the device comprises deformatting means for splitting the channel bit stream into the first component and the second component for successive picture blocks, each said mean value for successive picture blocks being accommodated at channel bit stream positions which form a sub-picture in a picture signal having a lower definition.

6. A device as claimed in claim 5, wherein the decoding means comprise an inverse picture transformer (63) to which a mean value of the sub-picture is applied as a DC coefficient of a transformed picture block.

7. A device as claimed in claim 5, wherein the device is further provided with means (65, 66) for forming the mean value of the picture block from a plurality of mean values of sub-blocks of a picture block.

8. A device as claimed in claim 5, wherein the deformatting means (5) comprise a first memory (51) for storing the mean values, a second memory (52) for storing the other data words, and control means (53, 54) for storing the channel bit stream in the first memory during a sub-picture period and in the second memory outside said sub-picture period.

9. A device as claimed in claim 1, wherein the device is provided with scrambling means for scrambling the other data words.

10. A device as claimed in claim 5, wherein the device is provided with descrambling means for descrambling the other data words.

11. A device as claimed in claim 2 wherein the device is further provided with means (25, 26) for forming a plurality of mean values of sub-blocks for each picture block.

12. A device as claimed in claim 6 wherein the device is further provided with means (65, 66) for forming the mean value of the picture block from a plurality of mean values of sub-blocks of a picture block.

13. A device as claimed in claim 2 wherein the device is provided with scrambling means for the other data words.

14. A device as claimed in claim 3 wherein the device is provided with scrambling means for the other data words.

15. A device as claimed in claim 11 wherein the device is provided with scrambling means for the other data words.

16. A device as claimed in claim 4 wherein the device is provided with scrambling means for the other data words.

17. A device as claimed in claim 6 wherein the device is provided with descrambling means for descrambling the other data words.

18. A device as claimed in claim 7 wherein the device is provided with descrambling means for descrambling the other data words.

19. A device as claimed in claim 1, wherein the first component is a DC component and the second component is a AC component.

20. A device as claimed in claim 5, wherein the first component is a DC component and the second component is a AC component.

* * * * *